(12) United States Patent
Hansen (10) Patent No.: US 7,934,764 B2
(45) Date of Patent: May 3, 2011

(54) TRIANGULAR WINDOW SHADE FOR MOTOR VEHICLES

(75) Inventor: Melf Hansen, Gondelsheim (DE)

(73) Assignee: BOS GmbH & Co. KG, Ostfildern (DE)

( * ) Notice: Subject to any disclaimer, the term of this patent is extended or adjusted under 35 U.S.C. 154(b) by 572 days.

(21) Appl. No.: 12/001,178

(22) Filed: Dec. 10, 2007

(65) Prior Publication Data

US 2008/0142173 A1  Jun. 19, 2008

(30) Foreign Application Priority Data

Dec. 11, 2006  (DE) .................... 10 2006 058 598

(51) Int. Cl.
*B60J 1/20* (2006.01)
*B60J 3/00* (2006.01)
*B60J 11/00* (2006.01)

(52) U.S. Cl. .................................. 296/97.8; 160/370.22

(58) Field of Classification Search ............... 160/121.1, 160/233, 244, 264, 265, 266, 267.1, 268.1, 160/269, 270, 272, 275, 276, 290.1, 291, 160/293.1, 294; 296/97.4, 97.11, 97.8, 142

See application file for complete search history.

(56) References Cited

U.S. PATENT DOCUMENTS

| 5,601,134 | A | * | 2/1997 | Pinkalla et al. | ............... 160/271 |
| 7,669,635 | B2 | * | 3/2010 | Thumm | ............... 160/290.1 |
| 2003/0006630 | A1 | * | 1/2003 | Kralik et al. | ............... 296/214 |
| 2005/0126724 | A1 | | 6/2005 | Ayran | |
| 2006/0260771 | A1 | | 11/2006 | Takeuchi et al. | |

FOREIGN PATENT DOCUMENTS

| DE | 198 26 537 A1 | 12/1999 |
| DE | 19826537 A1 * | 12/1999 |
| DE | 29921860 U1 | 7/2000 |
| DE | 20 2004 020 177 U1 | 3/2005 |
| DE | 10354233 A1 | 6/2005 |
| EP | 1 129 871 A1 | 9/2001 |
| EP | 1676735 A2 | 7/2006 |

OTHER PUBLICATIONS

European Patent Office Search Report, in European Application No. 07015858.9 (Sep. 3, 2009).

* cited by examiner

*Primary Examiner* — Katherine Mitchell
*Assistant Examiner* — Jeremy C Ramsey
(74) *Attorney, Agent, or Firm* — Leydig, Voit & Mayer, Ltd.

(57) ABSTRACT

A window shade for the triangular window of a rear side door of a motor vehicle is provided which includes a guide rail that extends substantially over the entire bottom edge. In the vicinity of the winding shaft, either a pocket is present or the guide rail from there becomes after a short transitional arc a section that runs at a slant. The sliding body of the slide that runs in the guide rail is rotated appropriately to align the connection arm of the slide parallel to the window post.

28 Claims, 5 Drawing Sheets

TRIANGULAR WINDOW SHADE FOR MOTOR VEHICLES

FIELD OF THE INVENTION

The present invention relates to window shades for motor vehicles.

BACKGROUND OF THE INVENTION

The rear side window of many passenger cars is divided by a window bar into an approximately triangular area and a rectangular area. The shading of the rectangular area with the help of a shade is generally straightforward. However, shading the triangular area can be more difficult.

Typically, a recess is present in the door below the triangular area. This recess is produced by the wheel housing in the car body. As a result of the recess, the available space inside the body of the door below the triangular area is very limited. As a rule, it is not possible to extend the guide rail for the triangular window shade a sufficient distance in the direction towards the tip of the triangular area. The guide rail must end a certain distance before the tip. As a result, the drive element that connects the tip of the shade sheet to the slide in the guide rail must be either movable or it must perform, together with the slide, a pivoting motion during the course of the deployment movement. In each case, in the retracted state, the catch that produces the coupling between the shade sheet and the slide below the bottom edge of the window must be parallel to the window post when the shade is retracted, so that it is visible as little as possible.

To force the pivoting motion, it is known to use two guide rails that enclose an angle, where the distance between the guide rails decreases towards the back of the vehicle (i.e., in the direction of the tip of the triangular window). One end of the guide slide runs in one guide groove and the other end of the guide slide extends in the other guide groove. However, because the two grooves come closer to each other, the slide performs the desired pivoting motion at the end of the window. However, this arrangement requires considerable space in the vertical direction. Moreover, the guide rails in which the slide runs are also quire expensive.

A side window shade is disclosed in EP 1 676 735 A2 in which only one guide rail below the bottom edge of the window is used. Over the entire length, the guide rail has a curved profile that is approximately parallel to the upper edge of the small window in such a way that both radii of curvature have the same center. As a result, a relatively deep pocket is formed in the vicinity of the back edge of the window, because the guide rail is set backwards by a very large distance at that location as compared to the bottom edge of the window. Deep pockets that open upwards are very undesirable in a motor vehicle. It is easy for parts to fall in them, which can then not be removed at all or only with considerable difficulty. This applies particularly to the back area of the motor vehicle where the passengers are usually children.

BRIEF SUMMARY OF THE INVENTION

In view of the foregoing, a general object of the present invention is to provide a window shade for the back window portion of the rear side windows of a motor vehicle which avoids the aforementioned drawbacks.

As used herein, the term triangular window section includes windows whose extent over the height becomes much smaller towards the back edge and which, in some circumstances, may end not in a rounded tip, but in a slanted straight edge. In windows with a slanted straight edge, it is as if the rounded tip that is usually have had been cut off. However, in the broadest sense, these windows also have an approximately triangular shape, although from a purist geometric standpoint are more trapezoidal, with the edge that is bent away from the bottom edge having an arcuate curvature or a sloped orientation.

The novel window shade for the rear, approximately triangular, side window section of the present invention includes a winding shaft, which is attached rotatably at the window post. One edge of a shade sheet is to the winding shaft. The shape of the shade sheet corresponds to the shape of the back window section.

A guide rail runs immediately beneath the bottom edge of the window. A slide runs in the guide rail. The slide is connected by an arm to the tip of the shade sheet. To achieve the desired pivoting motion of the catch, the guide rail, in an area which abuts against the window post, has a straight course that slopes downward. During the movement of the slide along the guide rail in the direction towards the window post, the arm at first runs exactly parallel to the bottom edge with its longitudinal axis continuing to slant downwards in the direction towards the back end of the window. It is only in the vicinity of the window post that the arm performs a pivoting motion, which moves it out of the sloped position into a position in which its longitudinal extension is approximately parallel to the window post.

This arrangement prevents the formation of a long and deep pocket beneath the bottom edge of the window. The pocket that is produced by the guide rail dipping away, in the arrangement of the invention, is small in size, measured in an orientation parallel to the bottom edge of the window. The probability of objects collecting in it is accordingly small.

According to another embodiment of the invention, the guide rail runs over substantially the entire section. In the vicinity of the window post, it contains an opening that points downwards into which the end of the slide that is adjacent to the window post almost falls, while the other end remains in the guide rail. As a result, the desired pivoting motion occurs, again immediately in the vicinity of the window post.

The drive device can include a spring motor, which directly drives the winding shaft. The winding shaft can be cylindrical or conical. A cylindrical winding shaft is advantageous if the bottom edge of the window forms a right angle with the window post. On the other hand, a conical winding shaft is advantageous if the bottom edge of the window and the window post form an angle that differs from 90°.

The first straight section advantageously has a length which is more than 60%, preferably more than 80%, of the total length of the bottom edge of the window. As a result, the guide rail in the immediate vicinity extends over a majority portion of the bottom edge of the window.

To avoid a jamming of the slide, the slide can advantageously consist of a middle section and two end sections, where the cross section of the middle section is smaller than the cross section of the end pieces.

The end pieces are advantageously substantially identical to each other. A pivoting of the end pieces in the guide rails can be facilitated if at least one of them is delimited by a curved side surface, whose axis of curvature forms a right angle with the running axis of the slide (i.e., it stands perpendicularly with respect to a plane defined by the window pane).

Reproducible drive conditions are achieved if the linear actuation element bears teeth. The linear actuation element can also have peripheral teeth. Depending on the installation conditions, the linear actuation element can be resiliently flexible. Additionally, the drive device can comprise a gear motor, whose output gear wheel has teeth that match the teeth of the linear actuation element.

Depending on the design, the guide rail may have only one groove chamber. The drive element and the slide can run in this groove chamber. Depending on the available space and the drive conditions, it may be advantageous for the guide rail to contain an additional guide groove over a portion of its length, which groove in cross section consists of a groove chamber and a groove slot, where the groove slot opens into the groove chamber of the first guide groove from the side. The drive element can run in the second groove chamber. As a result, it is possible to adapt one groove chamber to the cross section of the slide and the other groove chamber to the drive element, in order to achieve good guidance which prevents buckling out even when the drive elements have small cross sections. Depending on the space conditions, the two groove chambers can lie one above another or side by side, with respect to the normal installation position.

To achieve the pivoting motion of the slide, the groove slot of the first guide groove can open upwards, while an opening located opposite the groove slot is contained in the wall area of the groove chamber. Measured in the direction parallel to the path of motion of the slide, the length of this opening can be shorter than the slide is long. The opening can be a part of a pocket, so that the opening downward remains closed.

If the depth of the pocket is greater than would correspond to the tilting of the slide in the rest position next to the winding shaft in such a way that the pivoting travel of the slide through the opening or the pocket is not limited, the pivoting motion is guided exclusively by the movement of the shade sheet, which contributes to the automatic compensation of assembly tolerances. If a spring that braces the slide against the tipping movement can be arranged in the pocket, rattling can be largely eliminated.

The driving of the slide becomes particularly reliable if the slide is coupled to the drive element not only with resistance against pressure but also with resistance against traction.

To avoid impeding the pivoting motion, the slide is coupled via an articulation to the drive element. As a result the slide can perform, with respect to the drive element, a pivoting motion without any pivot force being applied by the drive element to the slide.

Any transverse traction in the shade sheet can be avoided if the arm is attached to the shade sheet in a way which allows limited displacement. The virtual shortening of the arm caused by the pivoting motion is compensated by a movable linkage connection. Constraining forces that otherwise would be applied by the arm to the shade sheet are avoided.

The following description of preferred embodiments of the invention explains the aspects necessary for a better understanding of the invention. Other details that have not been described can be inferred by a person skilled in the art in the usual way from the description and the drawings. It is clear that several modifications are possible.

The figures are not necessarily to scale. To illustrate specific details, certain areas are represented in exaggerated size. Moreover, the drawing is simplified and does not contain each detail that may be present in a practical embodiment. In the description of the preferred embodiment, the terms above and below refer to the normal installation position, unless otherwise indicated.

DETAILED DESCRIPTION OF THE INVENTION

Figure 1:
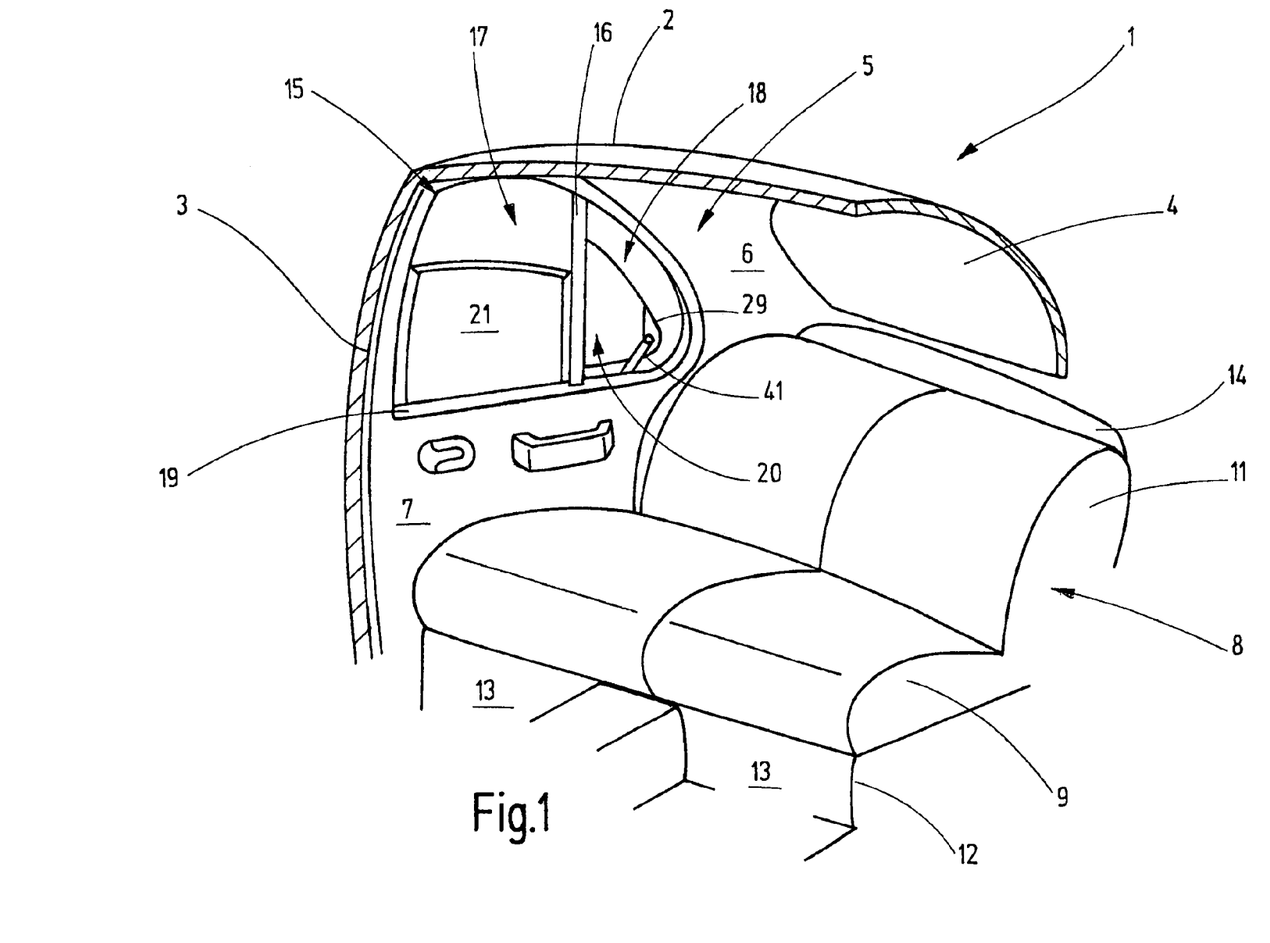
FIG. 1 is a cut-away perspective view of the backseat area of an illustrative passenger car equipped with a triangular side shade according to the invention.

Referring to FIG. 1, the backseat area of an exemplary passenger car is shown. The figure illustrates a view on the right inner side, which is a mirror image of the left inner side. The representation is simplified. Thus, for example, none of the internal structures of the body, such as reinforcement and fastening elements, are shown, because their representation is not necessary to understand the invention. Similarly, the representation of the body is schematic, and does not show the cavities that are present.

The illustrated body section 1 includes a roof 2. A B column 3 runs laterally downward from the roof 2 to a bottom groove. A corresponding B column is also provided on the broken-away opposite side of the vehicle. The roof 2 transitions into a rear window 4 at its back edge. The rear window ends to the side in a C column 5, which is spaced a distance from the B column 3. The C column 5 carries interior trim 6. A back, right side door 7 is attached between the B column 3 and the C column 6 by hinge in a known manner to the B column 3.

A back seat bench 8 is located at the height of the back, right side door 7. the seat bench 8 includes a seating surface 9 as well as a backrest 11. The back seat surface 9 is located on a foundation surface 12 in front of which the foot wells 13 are formed. At the level of the upper edge of the backrest 11, a rear shelf 15 extends towards the bottom edge of the rear window pane 4.

The rear right side door is provided with a side window 15, as is usually the case in limousines. The side window 15 is divided by an approximately vertical window post 16 into a substantially rectangular window section 17 as well as into an approximately triangular window section 18. At the lower end, the two sections 17 and 18 are delimited by a continuous straight window bottom edge 19. The window pane in the window section 17 can be moved up and down in the known way. For this purpose, it is guided in the known way in the vertical post 16, among other means. The window pane, in this case, is fixedly inserted into the triangular window section 18.

Each window section 17 and 18 is shaded by an associated shade sheet 20 and 21, respectively. The drive mechanism for the two shade sheets 20 and 21 is located in the interior space of the window 7 beneath the window bottom edge 19.

Figure 2:
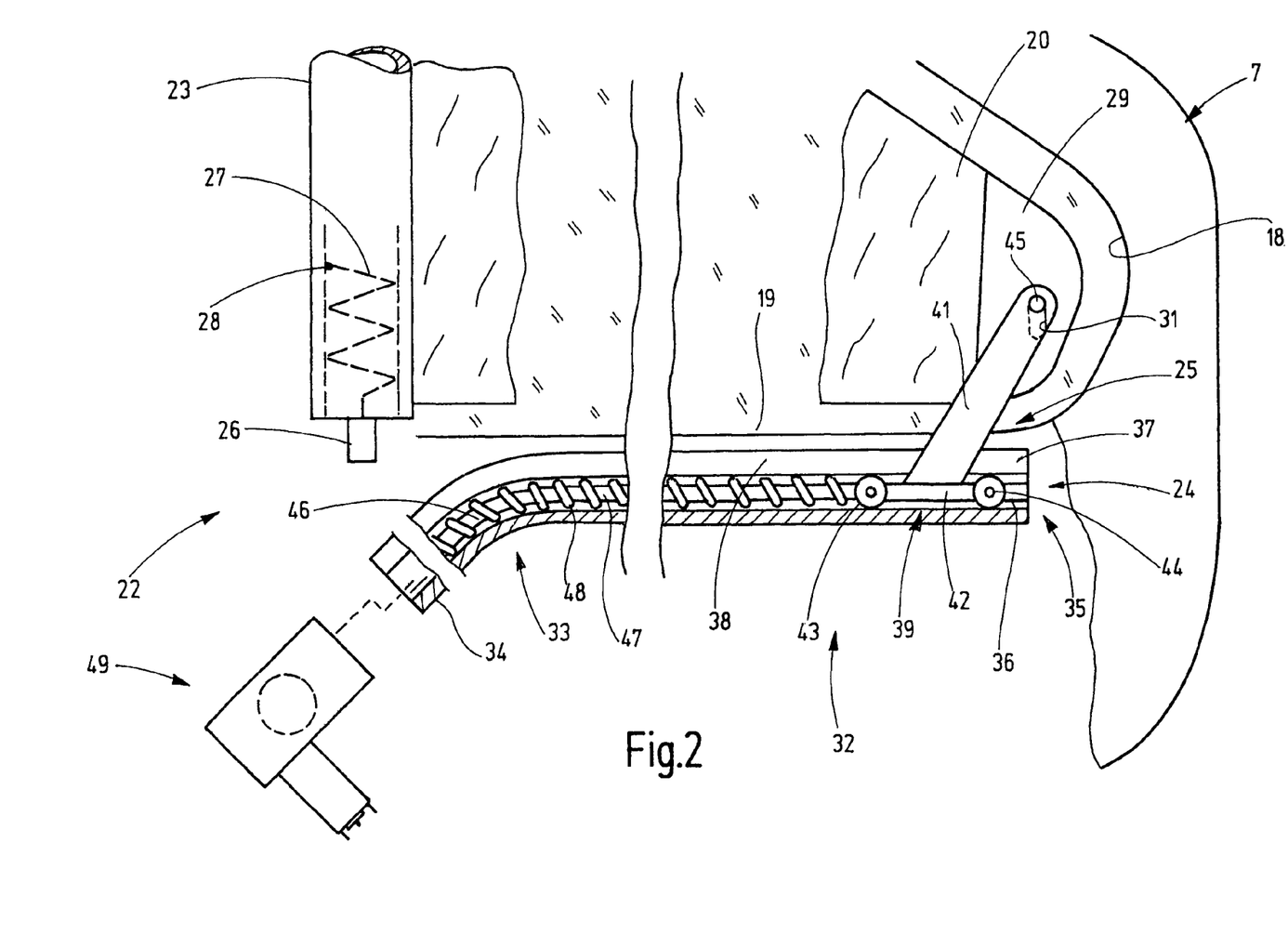
FIG. 2 is a partially cut-away schematic plan view of a drive and guide arrangement for the triangular side shade of FIG. 1.

As shown in FIG. 2, the shade sheet 20 is a part of a window shade 22. The window shade 22 also includes a winding shaft 23, a guide tail 24 and a slide 25. The winding shaft 23 is formed by a cylindrical tube, which is rotatably mounted in a housing provided in the window post 16. The axis of the winding shaft 23 thus runs substantially at a right angle with respect to the window bottom edge 19. The upper mounting of the winding shaft 23 is not shown in further detail. At the lower end, the winding shaft 23 has a pin 26, which is anchored rotatably in the door 7 and on which the winding shaft 23 turns. A spring motor in the form of a spiral tension spring 27 is arranged inside the winding shaft. The spiral tension spring 27 is connected at 28 to the inner side of the winding shaft 23, and fixed at its other end to the pin 26. With the help of the spring motor 27, the winding shaft 23 is biased in a direction of rotation for winding up the shade sheet 20.

The shade sheet 20 consists of a web material that is less transparent to light, for example, a nonwoven or a perforated film. Its shape corresponds approximately to the external contour of the window section 18 (i.e., the shape is approximately triangular). One edge of the shade sheet 20 is fixed to the winding shaft 23. The tip of the shade sheet turned away from the winding shaft 23 is provided with a reinforcement plate 29. The reinforcement plate 29 contains an elongated hole 31 with a vertical longitudinal axis. The purpose of the elongated hole 31 is described below.

The guide rail 24 consists, in its longitudinal extent, of a section 32 running parallel to the bottom edge, a short transitional area 33, and a connected section 34 which is again straight. The guide rail has a constant cross section over the length. The fastening elements for holding the guide rail 24 are not included in the Figure to simplify it. It will be clear to those skilled in the art how this should be implemented.

As shown in the FIG. 2, the straight section 32, starting from the back end of the window section 18, extends almost up to the winding shaft 23 (i.e., almost to the window post 16). The transitional area 33, whose length is clearly exaggerated In FIG. 2, is located with respect to the Figure just to the right of the winding shaft. The transitional area 33 extends over a distance which is less than 10% of the total length of the section 32. The section 34 is again straight and it runs, not parallel to the bottom edge 19 like the section 32, but at a sharp angle (i.e., it moves, starting from the transitional section 33, away from the bottom edge 19).

The guide rail 24 contains a guide groove 35 that consists of a groove chamber 36 and a groove slot 37. The cross section of the groove chamber 36 is approximately square. The cross section of the groove slot 27, of which a side wall 38 can be seen in FIG. 2, is flat rectangular, where the long edge of the rectangle is perpendicular with respect to the installation position of the guide rail. The groove slot 37 starts from approximately the center of the groove chamber 36 (i.e., both lie in the same perpendicular plane of symmetry running parallel to the plane of FIG. 2). The groove chamber 36 forms a flat floor facing the groove slot 37. The dimensions of the groove slot 37 and of the groove chamber 36 are chosen so that an undercut groove is produced.

The slide 25 consists of a sliding body 39 and an arm 41 formed on it. The sliding body 39 has a flat-lying middle piece 42 and two end pieces 43 and 44, which are an integral component of the slide body 39. As a result, the slide body 39 has, seen from the side, the shape of a dumbbell. The arm 41 extends upward at a slant from the middle piece 42.

The arm 41 starts from the middle piece 42, with which it is integrally formed. The arm has the flat edged shape shown in FIG. 2, and a thickness perpendicular to the plane of the drawing such that it fits, with little lateral play, through the slot 37 where it is guided. The top end of the arm contains a bore for a connection bolt 45, for example, in the form of a loose rivet, through which the arm 41 is connected to the reinforcement plate 29 in the area of the elongated hole 31. The connection is such that the arm 41 can be pivoted with respect to the reinforcement plate 29 and moved up and down in the elongated hole 31.

The end pieces 43 and 44 of the sliding body 39 are in the shape of a short cylinder, whose length corresponds to the width of the groove chamber 36. The diameter is slightly smaller than the height of the groove chamber 36, which results in the sliding body 39 being capable of running through the guide rail section 33 without jamming.

A linear drive element is guided inside the groove chamber 36 in a manner which prevents buckling. The linear drive element 46 consists of a cylindrical core 47 and a coil 48 which is rigidly connected to the core. As a result, a toothed rod which is resiliently flexible and has helical gearing, formed by the coil 48, is formed.

The driving of the drive element 46 is carried out by a gear motor 49 in a known way. The gear motor also can be used to move the shade sheet 21 synchronously with the shade sheet 20.

As shown, the arm 41 points in the direction of the back end of the window section 18. This orientation is required because in a practical implementation the guide rail 24 must end in front of the back end (i.e., before the tip of the window section 18). The available space inside the door 7 requires a corresponding shortening of the guide rail 24. As can be seen in FIG. 2, the arm 41 thus branches essentially away from the winding shaft 23.

The following is a discussion of the operation of the above-described window shade 22. For purposes of the discussion, the starting position is the position shown in FIG. 2. The slide 25 is located at the back end of the guide rail 24 (i.e., the back or right end piece 44 is located just inside the groove chamber 36). In this position, the tip of the shade sheet 20 with the reinforcement plate 29 is located in the vicinity of the back edge of the window section 18. The elongated hole 31 is positioned so that the shade sheet 20 can be supported by the connection bolt 45, and be carried parallel to the straight bottom edge 19. The spring motor 27 keeps the shade sheet 20 under tension, because the slide 25 is locked in the illustrated position by the drive element 46 with the help of the self-holding drive motor.

To retract the shade sheet, the gear motor 49 is set in rotation and, due to the positive coupling, the drive element 46 and a gear contained on gear motor 49 pulls the drive element 46 back out of guide rail 24. The details of the operational coupling between the drive element 46 and the drive motor 49 is described in numerous patents and patent applications assigned to the assignee of the present invention.

The drive element 46, which is connected to the gliding body 39 in a manner that is resistant to traction and pressure, pulls the slide 25 in the direction towards the winding shaft 23. To the extent that the slide 25 moves in the direction towards the winding shaft 23, the shade sheet is wound up. As soon as the leading end piece 43 reaches the transition area between the section 32 and the section 34, the sliding piece 39 starts a slight pivoting motion about an axis which is vertical with respect to the plane of the figure and thus also the plane of the window 18.

At the end of the retraction movement, either just the end piece 43 or both end pieces 43 and 44 are in the section 34. This section has an angle which is configured such that, at the end of the retraction movement, the arm 41 is oriented parallel to the axis of the winding shaft 23.

The purpose of the elongated hole 31 is compensating for the apparent shortening of the arm 41 that is the result of the pivoting motion so that the tip of the shade sheet 20 is not pulled by force to the bottom edge 19.

At the end of the retraction movement, the arm 41 is parallel to the window post 16 and is practically entirely hidden from view.

Figure 3:
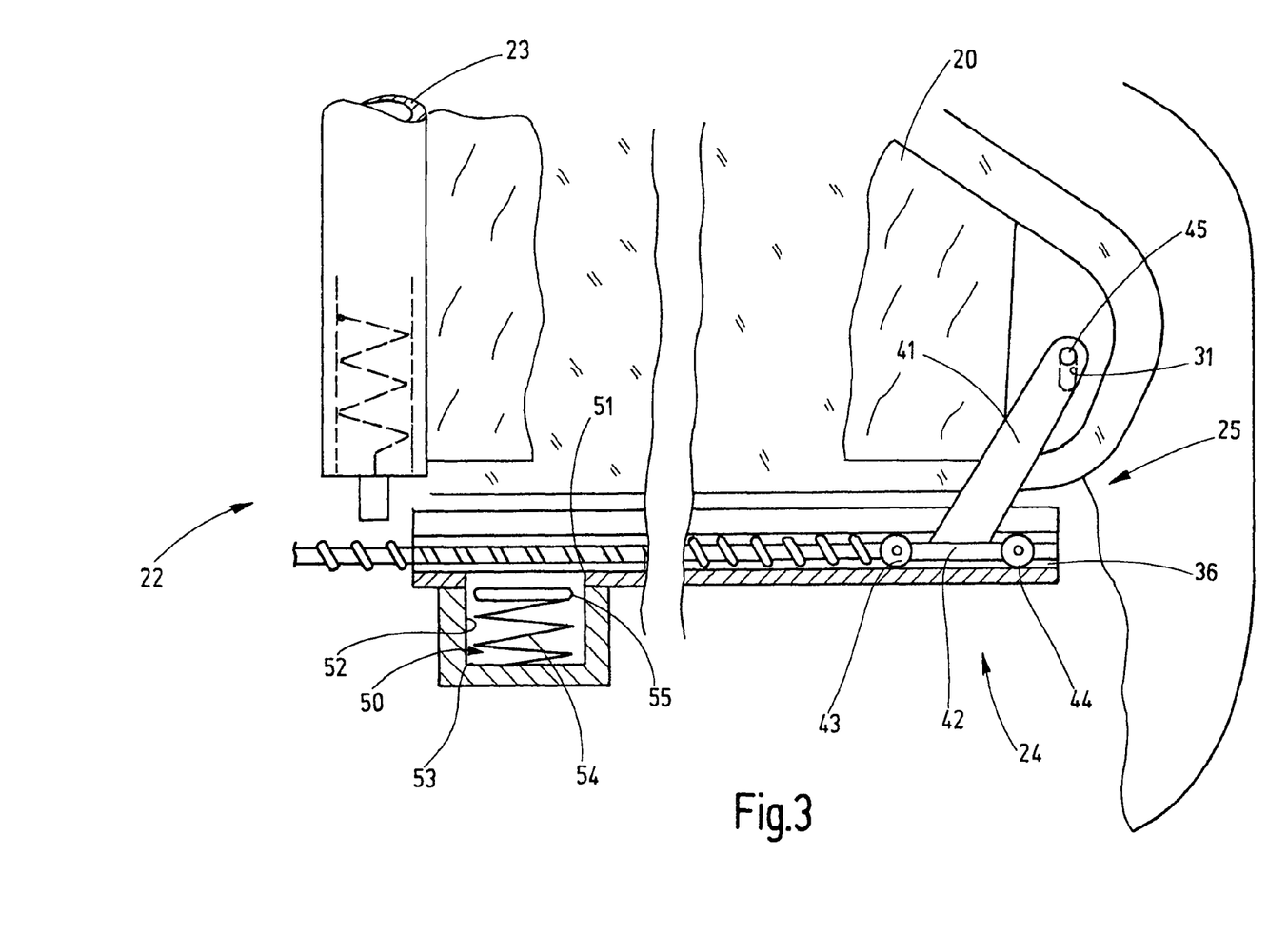
FIG. 3 is a partially cut-away schematic plan view of another embodiment of a drive arrangement for the triangular shade of FIG. 1.

A further embodiment of a triangular shade 22 according to the invention is shown in FIG. 3. The components that have already been described with respect to the embodiment of FIG. 2 bear the same reference numerals. In particular, the embodiment of FIG. 3 is largely the same as the embodiment of FIG. 2 insofar as the design of the winding shaft of the shade sheet of the window and of the slide is concerned.

In the embodiment of FIG. 3, the guide rail 24 is continuously straight. In the vicinity of the winding shaft 23, the groove chamber 36 contains a pocket 50 which leads downward. The width of the pocket in the direction perpendicular to the plane of the figure corresponds to the width of the groove chamber 36 or the length of the end pieces 43 and 44. At its upper edge 51, the pocket 51 becomes the bottom of the groove chamber 36. Towards the window post 16, the pocket 50 is delimited by a back wall 52, and downwards by a bottom 53. A short spiral tension spring 54 stands on the bottom 53, which holds a support plate 55 at its upper free end.

Figure 4:
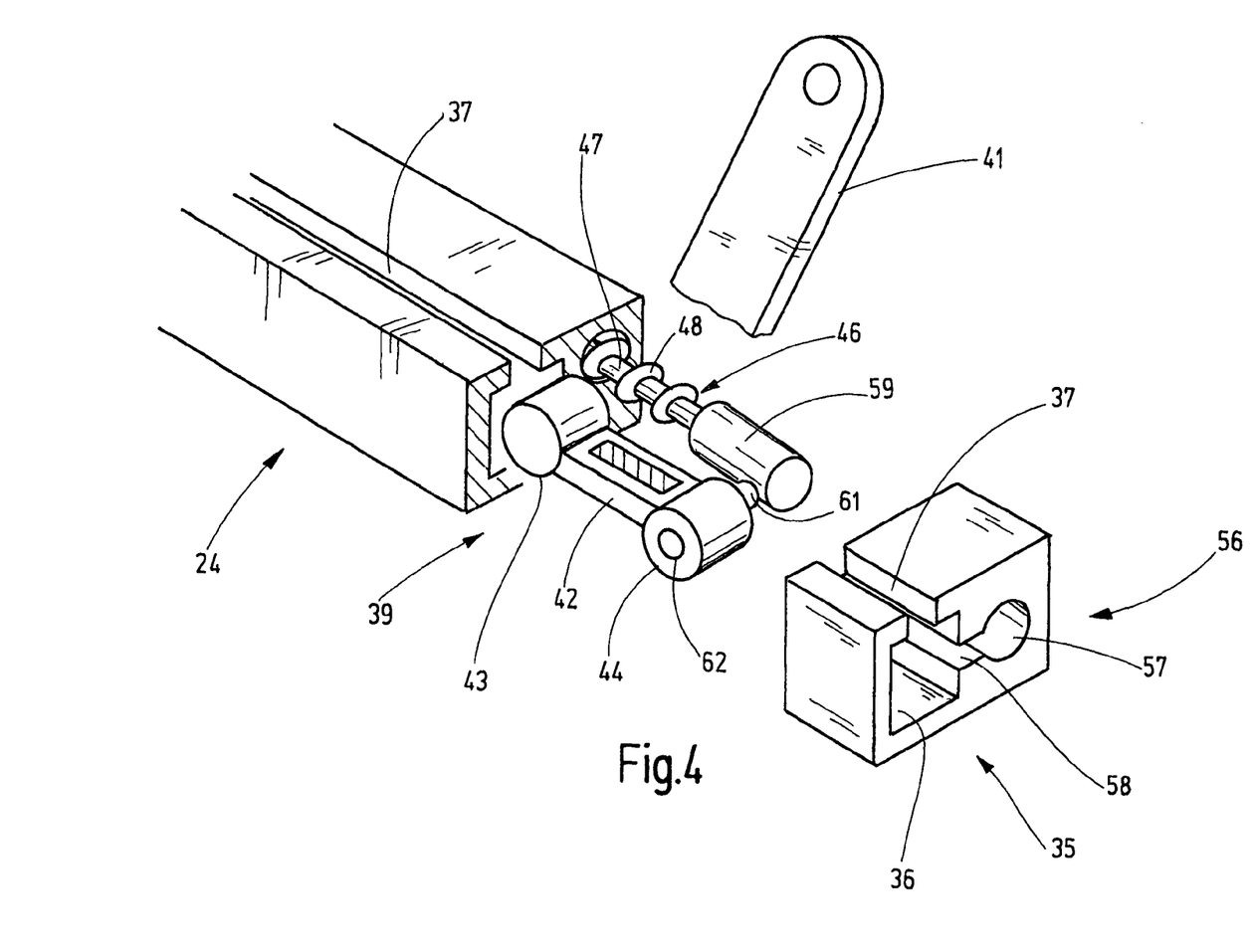
FIG. 4 is a cross-sectional perspective view of the guide rail of the drive arrangement of FIG. 3.

Otherwise, the substantial difference with the embodiment of FIG. 3 concerns the design of the guide rail 24, whose cross section is shown in FIG. 4. As shown in FIG. 4, a second guide groove 56 extends parallel to the first guide groove 35 in the base body of the guide rail 24. The cross section of the guide groove 56, in turn, consists of a groove chamber 57 and a groove slot 58. The guide groove 56 is an undercut guide groove. The groove chamber 27 has a circular cross section, while the cross section of the groove slot 58 is rectangular. The groove slot 58 connects the groove chamber 57 to the groove chamber 36, which thus has a square cross section. The diameter of the groove chamber 57 corresponds to the external diameter of the drive element 46, so that the drive element can be guided with very little radial play in the groove chamber 57 in a manner which prevents buckling.

The drive element 56 is provided, in a manner which is resistant to traction and pressure, with an end cap 59. A connection arm 61 extends radially from the end cap. The connection arm 61 is cylindrical, and it passes with small tolerance through the groove slot 58. It is inserted in a bore 62 of the back end piece 44. The bore 62 is coaxial with respect to the cylindrical circumferential surface of the end piece 44. The sliding body 39 is thus rotatable about the axis defined by the connection arm 61.

By means of the end cap 49, the connection arm 61 is connected, in a manner which is resistant to traction and pressure, to the drive element 46. The arm 46 forms a right angle with respect to the longitudinal axis of the drive element 46 when it slides through the groove chamber 57.

The drive element 46 has the same structure and is driven in a similar manner, namely by the drive motor 49, as the embodiment of FIG. 2.

Figure 5:
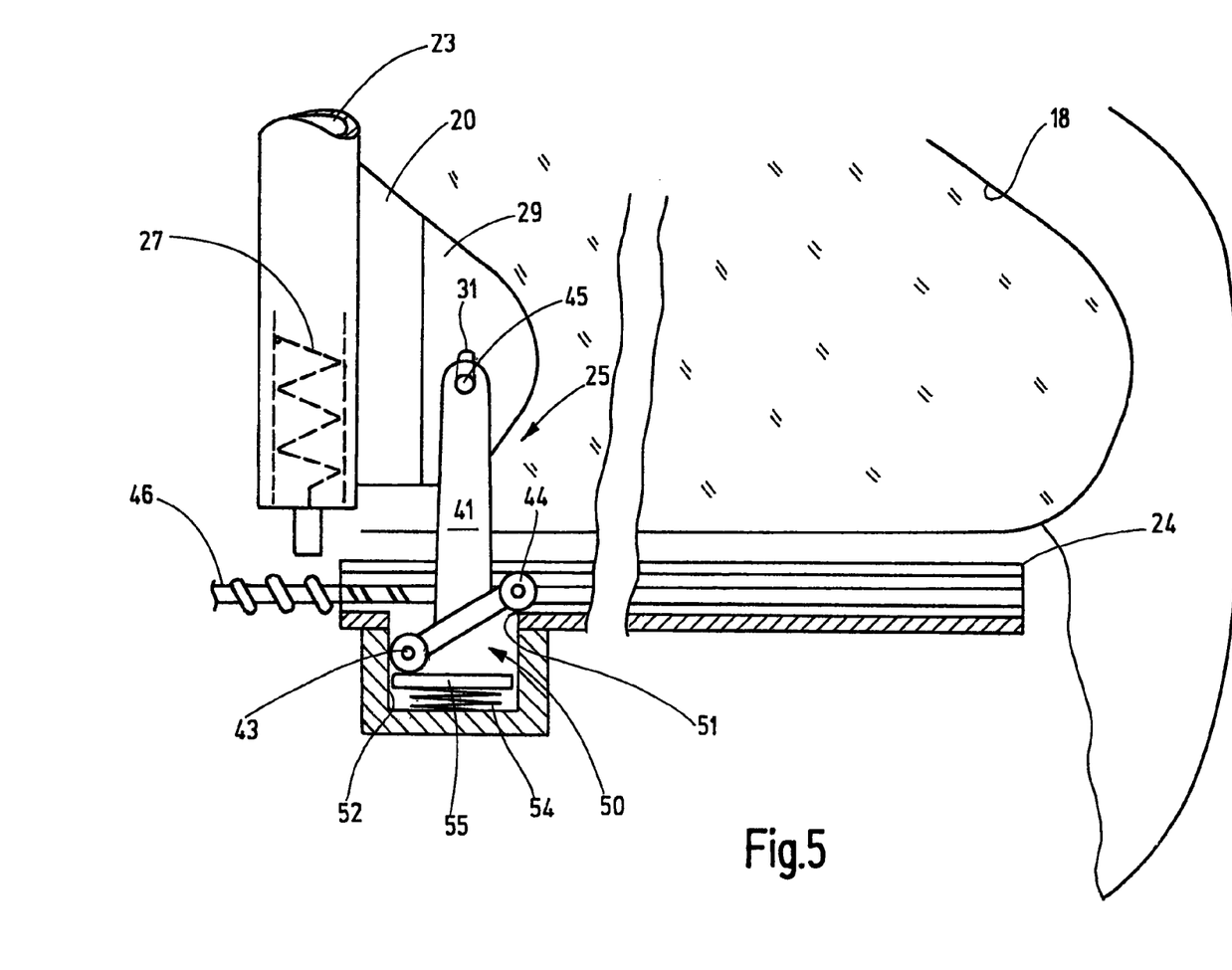
FIG. 5 is a partially cut-away schematic plane view of the drive arrangement of FIG. 3 showing the triangular window shade in another operational position.

The operation of the shade 22 of the embodiment of FIG. 3 is further understood with reference to FIG. 5. For purposes of the explanation, the shade starts in the extended position of FIG. 3. The slide 25 is located at the end of the window section 18 so that except for a small gap around the shade sheet 20, the window section 18 is covered. To achieve this full shading, the arm 41 extends over the end of the guide rail 24 backwards in the direction of the rear of the car. In the position shown in FIG. 3, the slide 25 is held by the linear drive element 46 with the help of the drive motor 49. The drive motor has pressed the slide 25 against the action of the spring motor 27 into the end position shown.

To retract the shade sheet 20, the drive motor 49 is actuated in the opposite direction of rotation. The drive motor pulls back the drive element 46 out of the guide line 24. Because of the coupling of the drive element 26 to the sliding element 39 via the connection arm 61, the entire slide 25 runs to the left with respect to FIG. 5. At the same time as the movement of the slide 25, the shade sheet 20 is wound up continuously on the winding shaft 23 under the action of the spring motor 27. During the entire movement, it remains under tension.

In the area of the window post 16, the end piece 43, which lies in the direction of the front of the vehicle, first passes the edge 51 of the pocket 50. As a result, the vertical force which is applied to the slide 25 by the end piece 53 is no longer introduced to the floor or bottom side of the groove chamber 36. The end piece 43 reaches the top side of the support plate 55, whose top side is at a distance corresponding to approximately half the diameter of the end piece 43 beneath the bottom surface of the groove chamber 36. Accordingly, the sliding body 39 performs a corresponding rotational movement about an axis which, together with the attached arm 41, is perpendicular with respect to the plane of the figure. During the course of the continued retraction movement of the drive element 46, the end piece 43 is pushed to contact the back wall 52 of the pocket 50. Because now the movement of the sliding body 39 is blocked in the direction to the window post 16, its end piece 43 will increasingly move downward in the pocket 15 along the wall 52. In the end position, the arm 41 is approximately perpendicular (i.e., parallel to the winding shaft 23). The end piece 44, to which the drive element 46 is coupled, continues to lie in the groove chamber 36 while the end piece 43 has assumed its lowest position in the pocket 50.

The pivoting motion of the sliding piece 39 is also supported by the traction force supplied at the free end of the arm 41 and exerted by the shade sheet 20.

The pressure spring 54 helps ensure that any rattling of the slide 25 in the pocket 50 is eliminated.

For advancing the shade, the drive motor is actuated in the opposite direction of rotation. As a result, the drive element 56 is advanced in the direction towards the back end of the window section 18. During the movement, the sliding body 39 is gradually lifted out of the pocket 50. After a sufficient distance of travel, the end piece 43 reaches the edge 51, and from there it is lifted to the bottom of the groove chamber 36. From there, the sliding body 39 is led by force in the groove chamber 36, and it can no longer undergo a tipping movement. The guide rail of FIG. 4 can also be used with the shade of FIG. 2.

A window shade for the triangular window of a rear side door of a motor vehicle is provided which includes a guide rail that extends substantially over the entire bottom edge. In the vicinity of the winding shaft, either a pocket is present or the guide rail from there becomes after a short transitional arc a section that runs at a slant. The sliding body of the slide that runs in the guide rail is rotated appropriately to align the connection arm of the slide parallel to the window post.

The invention claimed is:

1. A motor vehicle comprising a vehicle body with a rear side window, said rear side window being divided by an approximately vertically extending window post into a rectangular window section and a triangular side window section, the triangular side window section being bounded by a bottom edge and an upper edge that is sloped at an angle to the bottom edge;

a window shade for the triangular side window section including a winding shaft rotatably supported by the window post;

a shade sheet having an edge attached to the winding shaft and a tip, the shade sheet having a configuration adapted to the shape of the triangular side window section;

a guide rail extending along the bottom edge of the triangular side window section having a first end adjacent said vertically extending window post and a second end adjacent an end of the triangular window section opposite said window post, said guide rail defining a guide groove;

a slide having an upwardly extending arm connected to the tip of said shade sheet that is guided in said guide rail groove for movement between a retracted position adjacent said window post in which said shade sheet is wound up on said windup shaft and an extended position adjacent the second end of said guide rail in which said shade sheet overlies said triangular side window section;

a linear actuation element coupled to the slide;

a drive device for the winding shaft and the actuating element;

said slide arm extending vertically upwardly in parallel relation to said window post when said slide is in said retracted position at a location adjacent said window post, said slide arm being pivotable at a location adjacent said window post at the beginning of travel from the position parallel to said window post to a position oriented at acute angles to the window post and the bottom window edge as an incident to movement of the slide in a direction toward said extended position, and said guide groove maintaining said slide with said arm in an inclined position without further pivotal movement of the arm relative to the guide rail and window post during movement of said slide from said position adjacent the window post to said shade sheet extended position.

2. A shade according to claim 1 in which said groove includes a groove chamber for receiving said slide and a slot through which said arm extends, and said chamber having a uniform cross section and extending parallel to said bottom edge of the triangular window section from a position adjacent said window post to the second end of said guide rail.

3. A shade according to claim 1, wherein the slide includes a middle piece and two end pieces and the middle piece snaps back upwards relative to the end pieces.

4. A shade according to claim 3 in which said guide rail groove has a cross sectional configuration that includes a groove chamber and a groove slot, and said groove chamber includes an opening in the vicinity of the window post that allows the slide to perform a pivoting motion about an axis perpendicular with respect to a plane defined by a pane of the rear side window.

5. A shade according to claim 3, wherein the drive device comprises a spring motor that is associated with the winding shaft.

6. A shade according to claim 1, wherein the winding shaft has a substantially cylindrical shape.

7. A shade according to claim 1, wherein the window post extends at a right angle with respect to the bottom edge of the triangular side window section and the winding shaft is cylindrical.

8. A shade according to claim 1, wherein an angle defined by the bottom edge of the triangular side window section and the window post is less than 90° and the winding shaft has a conical shape.

9. A shade according to claim 1, wherein the length of the rectangular window section is more than 60% of the total length of the bottom edge of the triangular side window section.

10. A shade according to claim 1, wherein the end pieces are identical to each other.

11. A shade according to claim 4, wherein the end pieces are bounded by curved side surfaces having an axis of curvature that is oriented at a right angle with respect to a running axis of the slide.

12. A shade according to claim 1, wherein the linear actuation element carries teeth.

13. A shade according to claim 1, wherein the linear actuation element carries peripheral teeth.

14. A shade according to claim 1, wherein the linear actuation element is resiliently flexible.

15. A shade according to claim 12, wherein the drive device comprises a drive motor having an output gear wheel with teeth that match the teeth of the linear actuation element.

16. A shade according to claim 1, wherein the guide rail has only one guide groove with a groove chamber.

17. A shade according to claim 16, wherein the linear actuation element and the slide run in the groove chamber of the guide rail.

18. A shade according to claim 1, wherein the guide groove includes a first guide groove and a second guide groove having a cross-sectional configuration that includes a groove chamber and a groove slot, the groove slot of the second guide groove opening into the groove chamber of the first guide groove and wherein the linear actuation element runs in the groove chamber of the second guide groove.

19. A shade according to claim 18, wherein the groove chambers of the first and second guide grooves are next to each other.

20. A shade according to claim 4, wherein the groove slot of the guide groove opens upward and the opening is in a wall area of the groove chamber opposite the groove slot.

21. A shade according to claim 4, wherein the length of the opening measured in a direction parallel to a movement path of the slide is shorter than a length of the slide in the guide groove.

22. A shade according to claim 4, wherein the opening is a part of a pocket.

23. A shade according to claim 22, wherein a depth of the pocket is greater than a tipping of the slide in a starting position next to the winding shaft such that pivoting movement of the slide through the opening is not limited.

24. A shade according to claim 22, wherein a spring sits in the pocket.

25. A shade according to claim 1, wherein the slide is coupled to the drive element in a manner resistant to traction and pressure.

26. A shade according to claim 1, wherein the slide is coupled via a connection arm to the drive element.

27. A shade according to claim 1, wherein the tip of the shade sheet is connected to the slide such that the tip of the shade sheet is movable to a limited extent in the vertical direction.

28. A shade according to claim 27, wherein the shade sheet contains an elongated hole.

* * * * *